(12) United States Patent
Tamura et al.

(10) Patent No.: US 9,752,651 B2
(45) Date of Patent: Sep. 5, 2017

(54) DRIVING APPARATUS HAVING IMPROVED ENGAGEMENT

(71) Applicant: Kyocera Document Solutions Inc., Osaka (JP)

(72) Inventors: Yuuki Tamura, Osaka (JP); Arata Nakamura, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 264 days.

(21) Appl. No.: 14/308,732

(22) Filed: Jun. 19, 2014

(65) Prior Publication Data
US 2014/0373657 A1    Dec. 25, 2014

(30) Foreign Application Priority Data

Jun. 19, 2013  (JP) .................................. 2013-128345

(51) Int. Cl.
| | | |
|---|---|---|
| *F16H 1/48* | (2006.01) | |
| *F16H 1/08* | (2006.01) | |
| *F16H 1/28* | (2006.01) | |

(52) U.S. Cl.
CPC ............. *F16H 1/08* (2013.01); *F16H 1/2854* (2013.01); *F16H 1/48* (2013.01); *Y10T 74/19679* (2015.01); *Y10T 74/19684* (2015.01)

(58) Field of Classification Search
CPC ..... B29D 15/00; Y10T 74/19679; F16H 1/08; F16H 1/48; F16H 1/2854
USPC ........... 74/460, 458, DIG. 10, 414, 461, 457
See application file for complete search history.

(56) References Cited

U.S. PATENT DOCUMENTS

| | | | | |
|---|---|---|---|---|
| 4,676,117 A | * | 6/1987 | Schiel | ........................ F16H 1/08 492/7 |
| 6,076,419 A | * | 6/2000 | Mlejnek | .................. F16C 17/02 384/276 |
| 6,125,712 A | * | 10/2000 | Kaburagi | ................ F16D 1/108 403/14 |

(Continued)

FOREIGN PATENT DOCUMENTS

| | | | | |
|---|---|---|---|---|
| DE | 102012102780 A1 | * | 10/2013 | ............. B29D 15/00 |
| EP | 0074241 A | * | 3/1983 | ............. F16H 55/17 |

(Continued)

OTHER PUBLICATIONS

Machine translation of JP 2013137404.*

*Primary Examiner* — Terence Boes
*Assistant Examiner* — Randell J Krug
(74) *Attorney, Agent, or Firm* — James Judge

(57) ABSTRACT

A driving apparatus includes a driving input gear with first gear teeth, a columnar shaft, and a driven gear that engages the driving input gear. The driven gear includes a cylindrical boss portion, a cylindrical rim portion, a web, and second gear teeth. The second gear teeth are formed at an outer peripheral surface of the rim portion. The first gear teeth are first helical teeth twisted in a first direction with respect to a direction that the rotary drive shaft extends. The second gear teeth are second helical teeth twisting in a second direction that is the opposite of the first direction. The rim portion is tapered, radially decreasing toward the end to which the web is linked. The through-hole of boss portion has an inner diameter larger than an outer diameter of the shaft.

1 Claim, 6 Drawing Sheets

(56) References Cited

U.S. PATENT DOCUMENTS

2002/0014133 A1* 2/2002 Kimizuka ............... B29C 33/44
                                                    74/460
2005/0103142 A1* 5/2005 Hamilton .................. F16H 1/14
                                                    74/459.5
2005/0252328 A1* 11/2005 Shattuck ............... F16C 13/006
                                                    74/431

FOREIGN PATENT DOCUMENTS

| JP | 2001-153207 A | 6/2001 |
| JP | 2007-032639 A | 2/2007 |
| JP | 2010-204384 A | 9/2010 |
| JP | 2011-022369 A | 2/2011 |
| JP | 2012-229708 A | 11/2012 |
| JP | 2013137404 A * | 7/2013 |

* cited by examiner

DRIVING APPARATUS HAVING IMPROVED ENGAGEMENT

CROSS-REFERENCE TO RELATED APPLICATION

This application is based upon, and claims the benefit of priority from, corresponding Japanese Patent Application No. 2013-128345 filed in the Japan Patent Office on Jun. 19, 2013, the entire contents of which are incorporated herein by reference.

BACKGROUND

Unless otherwise indicated herein, the description in this section is not prior art to the claims in this application and is not admitted to be prior art by inclusion in this section.

An image forming apparatus includes various rotators. For example, the image forming apparatus includes a photoreceptor drum on which electrostatic latent images and toner images are formed, a developing roller, a drive roller, a conveyance roller, and a similar unit. The developing roller is to supply the photoreceptor drum with toner. The drive roller circularly drives a transfer belt to which the toner image is to be primarily transferred. The conveyance roller is to convey a sheet along a conveyance path. There is a driving apparatus for these units that includes a driving motor, a pinion gear (a driving input gear), and a driven gear. The pinion gear is directly connected to the motor. The driven gear engages the pinion gear.

SUMMARY

A driving apparatus according to the disclosure includes a driving input gear, a columnar shaft, and a driven gear. The driving input gear has a rotary drive shaft and first gear teeth, the rotary drive shaft being configured to receive rotary driving power. The first gear teeth are integrally formed with the rotary drive shaft. The columnar shaft extends parallel to the rotary drive shaft. The driven gear engages the driving input gear. The driven gear includes a cylindrical boss portion, a cylindrical rim portion, a web, and second gear teeth. The cylindrical boss portion is wholly made of a resin material, the boss portion having a through-hole through which the columnar shaft is inserted. The cylindrical rim portion is disposed concentrically with and outer peripherally of the boss portion. The web links a circumferential surface of the boss portion with the rim portion along one end of the rim portion axially. The second gear teeth are formed on an outer peripheral surface of the rim portion. The first gear teeth are first helical teeth twisting in a first direction with respect to a direction in which the rotary drive shaft extends. The second gear teeth are second helical teeth twisting in a second direction that is the opposite of the first direction. The rim portion is tapered, radially decreasing toward the end to which the web is linked. The through-hole in the boss portion has an inner diameter greater than the columnar shaft outer diameter. The rotary drive shaft rotational direction, the first direction, and the second direction are established such that, with the driven gear tilting because of clearance between the through-hole and the columnar shaft, under thrust power generated by engagement between the first helical teeth and the second helical teeth and transmission of the rotary driving power from the driving input gear to the driven gear, the inclination changes the posture of the tapered rim portion so as to parallel the rotary drive shaft.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
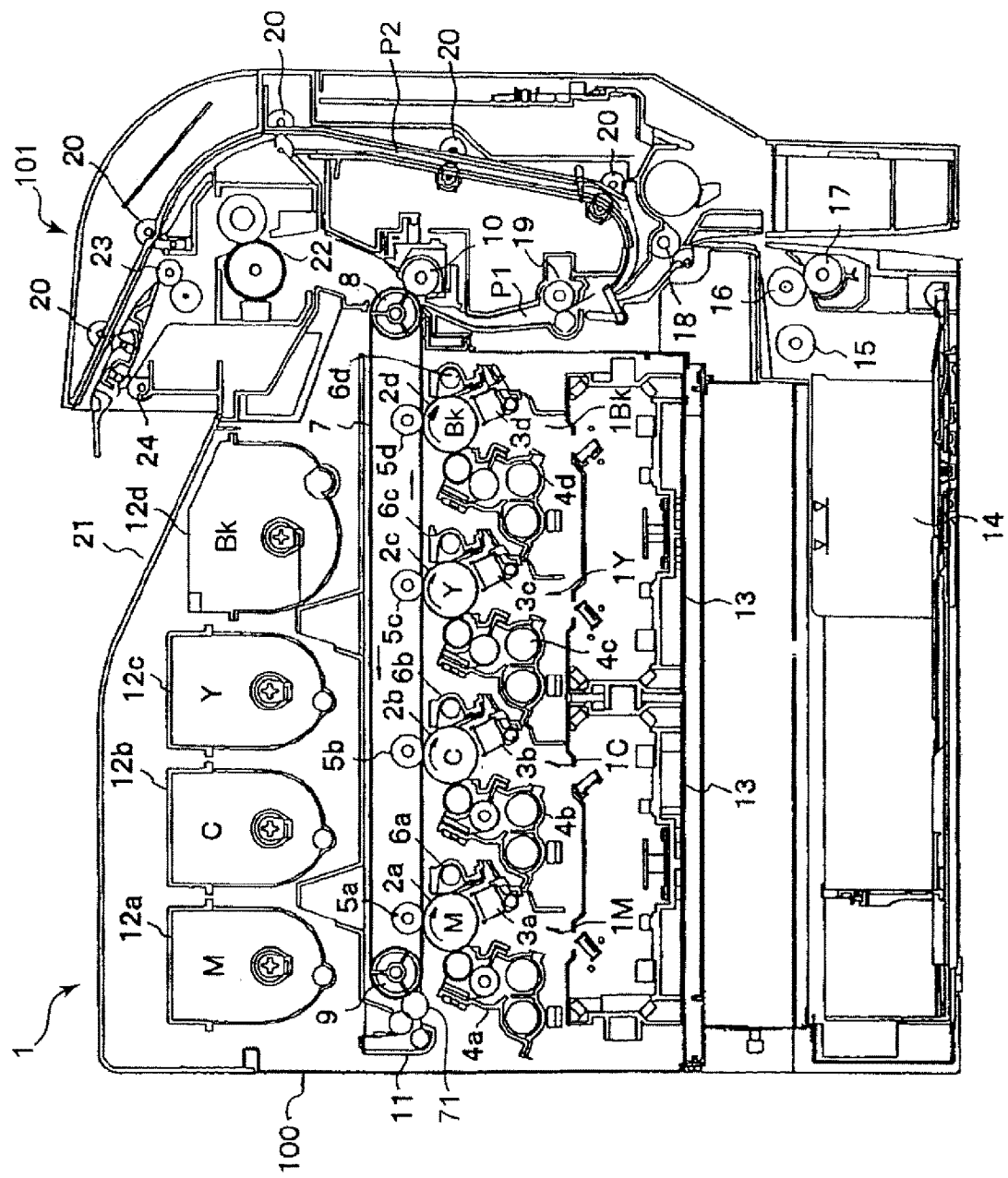
FIG. 1 illustrates an internal structure of an image forming apparatus (a driving apparatus) according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure in detail based on the drawings. FIG. 1 illustrates a cross section of an internal structure of an image forming apparatus 1 according to one embodiment of the disclosure. Here, as one aspect of a driving apparatus, an image forming apparatus formed of a tandem color laser printer is exemplified. The image forming apparatus may be a copier, a facsimile device, or a multi-functional peripheral with these functions.

The image forming apparatus 1 includes a main body housing 100. The main body housing 100 constitutes an outer body and houses various apparatuses. The image forming apparatus 1 includes a magenta image forming unit 1M, a cyan image forming unit 1C, a yellow image forming unit 1Y, a black image forming unit 1Bk, an intermediate transfer unit 11, toner containers 12a to 12d, an exposure unit 13, and a sheet feed cassette 14 in the main body housing 100. The magenta image forming unit 1M, the cyan image forming unit 1C, the yellow image forming unit 1Y, and the black image forming unit 1Bk are tandemly located at constant intervals. The intermediate transfer unit 11 and the toner containers 12a to 12d are located above these image forming units 1M, 1C, 1Y, and 1Bk. The exposure unit 13 and the sheet feed cassette 14 are located below these image forming units 1M, 1C, 1Y, and 1Bk.

The image forming units 1M, 1C, 1Y, and 1Bk include photoreceptor drums 2a, 2b, 2c, and 2d, respectively. Around the photoreceptor drums 2a, 2b, 2c, and 2d, charging rollers 3a, 3b, 3c and 3d, developing devices 4a, 4b, 4c, and 4d, primary transfer rollers 5a, 5b, 5c, and 5d, and drum cleaning apparatuses 6a, 6b, 6c, and 6d are located, respectively. Since the respective image forming units 1M, 1C, 1Y, and 1Bk have actually the same constitution, the following representatively describes details of the magenta image forming unit 1M.

The photoreceptor drum 2a rotates around its axis. On a circumference surface of the photoreceptor drum 2a, an electrostatic latent image and a toner image are formed. As the photoreceptor drum 2a, a photoreceptor drum using an amorphous silicon (a-Si)-based material can be employed. The charging roller 3a uniformly charges the surface of the photoreceptor drum 2a. After the charge, the exposure unit 13 exposes the circumference surface of the photoreceptor drum 2a, thus forming the electrostatic latent image.

The developing device 4a supplies the circumference surface of the photoreceptor drum 2a with toner to develop the electrostatic latent image formed on the photoreceptor drum 2a. The developing device 4a is for two-component developer. The developing device 4a includes a pair of agitation rollers, a magnetic roller, and a developing roller. The primary transfer roller 5a sandwiches an intermediate transfer belt 7 included in the intermediate transfer unit 11 and forms a nip portion with the photoreceptor drum 2a. Thus, the toner image on the photoreceptor drum 2a is primarily transferred on the intermediate transfer belt 7. The drum cleaning apparatus 6a cleans the circumference surface of the photoreceptor drum 2a after transfer of the toner image.

The intermediate transfer unit 11 includes the intermediate transfer belt 7, a drive roller 8, and a driven roller 9. The intermediate transfer belt 7 is tightly stretched between the drive roller 8 and the driven roller 9. Facing and contacting the drive roller 8, a secondary transfer roller 10 is located. At the proximity of the driven roller 9, a belt cleaning apparatus 71 is located. The drive roller 8 and the secondary transfer roller 10 form a secondary transfer unit. The secondary transfer unit transfers the toner image on the intermediate transfer belt 7 to a sheet. Several layers of toner images are put on the intermediate transfer belt 7 from the respective photoreceptor drums 2a, 2b, 2c, and 2d (primary transfer). The secondary transfer unit secondarily transfers the layered toner images to a sheet supplied from the sheet feed cassette 14 or the manual paper feed tray.

The toner containers 12a, 12b, 12c, and 12d are arranged side by side in a row above the respective image forming units 1M, 1C, 1Y, and 1Bk. These toner containers 12a, 12b, 12c, and 12d store a toner for magenta, a toner for cyan, a toner for yellow, and a toner for black, respectively. The toners with respective colors are supplied to the developing devices 4a, 4b, 4c, and 4d of the image forming units 1M, 1C, 1Y, and 1Bk corresponding to the respective colors of M, C, Y, and K through a supply path (not illustrated).

The exposure unit 13 includes various optical system apparatuses such as a light source, a polygon mirror, a reflective mirror, and a deflection mirror. The exposure unit 13 irradiates light, which are based on image data provided from an external device or a similar device, to the circumference surfaces of the photoreceptor drums 2a, 2b, 2c, and 2d provided to the respective image forming units 1M, 1C, 1Y, and 1Bk, so as to form electrostatic latent images.

The sheet feed cassette 14 houses a sheet bundle formed by lamination of a plurality of sheets. A pickup roller 15 is located at an upper portion at a right end side of the sheet feed cassette 14. Driving the pickup roller 15 feeds the sheet of the uppermost layer of the sheet bundle in the sheet feed cassette 14 one by one. At a downstream side of the pickup roller 15, a feed roller 16 and a retard roller 17 are located. The feed roller 16 and the retard roller 17 send out the fed sheet to a conveying path P1.

The conveying path P1 vertically extends at a side portion of the main body housing 100. The conveying path P1 is a path for conveying a sheet on which a toner image is to be transferred. The conveying path P1 includes a conveyance roller pair 18 and a registration roller pair 19. The conveyance roller pair 18 conveys the sheet. The registration roller pair 19 supplies the sheet to the secondary transfer unit at a predetermined timing after the registration roller pair 19 causes the sheet to temporarily stand by for correcting skew. At the next to the conveying path P1, an inverting conveying path P2 is formed. The inverting conveying path P2 is employed for inversely conveying the sheet up to the upstream side of the registration roller pair 19 during duplex printing. The inverting conveying path P2 includes a plurality of conveyance roller pairs 20 spaced at appropriate intervals.

A fixing unit 22 and a sheet discharge unit 101 are located at a downstream with respect to the secondary transfer unit in the conveying path P1. The fixing unit 22 includes a fixing roller and a pressure roller. The fixing unit 22 heats and pressures the sheet on which the toner image is secondarily transferred at the secondary transfer unit performs a fixing process. The sheet discharge unit 101 is located downstream of the fixing unit 22. The sheet discharge unit 101 includes a conveyance roller pair 23 and a part of a discharging roller pair 24 and conveyance roller pair 20. The sheet discharge unit 101 discharges the sheet on which the fixing process is performed from a discharge port of the main body housing 100 to a sheet discharge tray 21.

Subsequently, the following describes an image forming operation by the image forming apparatus 1 with the above-described constitution. Upon an instruction signal for starting image formation, the respective photoreceptor drums 2a to 2d are rotatably driven at the respective image forming units 1M, 1C, 1Y, and 1Bk at a predetermined process speed in the arrow direction in FIG. 1 (clockwise direction). Charging rollers 3a to 3d uniformly charge these photoreceptor drums 2a to 2d. The exposure unit 13 emits laser beams modulated by color image signals with respective colors. The exposure unit 13 then irradiates the laser beams to the surface of the respective photoreceptor drums 2a to 2d. This forms respective electrostatic latent images corresponding to the color image signals with respective colors on the respective photoreceptor drums 2a to 2d.

Afterwards, the developing device 4a supplies the electrostatic latent image formed on the photoreceptor drum 2a of the magenta image forming unit 1M with the magenta toner, thus the electrostatic latent image becomes a visible image as a magenta toner image. This magenta toner image is primarily transferred on the intermediate transfer belt 7 rotatably driven in the arrow direction in FIG. 1 at the primary transfer unit between the photoreceptor drum 2a and the primary transfer roller 5a. Similarly, the cyan image forming unit 1C, the yellow image forming unit 1Y, and the black image forming unit 1Bk also respectively form a cyan toner image, a yellow toner image, and a black toner image. These toner images are transferred on the intermediate transfer belt 7 so as to be superimposed on the magenta toner image, which was previously transferred, at the respective primary transfer units. Thus, a full-color toner image is formed on the intermediate transfer belt 7. The respective drum cleaning apparatuses 6a to 6d remove transfer residual toner, which has not been transferred to the intermediate transfer belt 7 and remains on the respective photoreceptor drums 2a to 2d.

Then, the registration roller pair 19 conveys the sheet sent out from the sheet feed cassette 14 to the conveying path P1 to the secondary transfer unit at a timing where the top of full color toner image on the intermediate transfer belt 7 reaches the secondary transfer unit between the drive roller 8 and the secondary transfer roller 10. The secondary transfer roller 10, to which a secondary transfer bias with polarity reverse to the toner is applied, secondarily transfers the full-color toner image from the intermediate transfer belt 7 to the sheet conveyed to the secondary transfer unit.

Then, the sheet is conveyed to the fixing unit 22, and the full-color toner image is heated and pressurized, thus the full-color toner image is heat-fixed on the surface of the sheet. The conveyance roller pair 23 and the discharging roller pair 24 of the sheet discharge unit 101 discharge the sheet, on which the toner image is fixed, on the sheet discharge tray 21. The belt cleaning apparatus 71 removes toner that is not transferred on the sheet and remains on the intermediate transfer belt 7.

The above describes operations of forming an image on one surface of a sheet. To form images on both surfaces of a sheet, the sheet discharge unit 101 reversely conveys the sheet where the image is formed at one surface through the above-described processes, and then introduces the sheet to the inverting conveying path P2. The conveyance roller pair 20 conveys the sheet on the inverting conveying path P2. Then, the sheet whose front and back are inverted heads for the registration roller pair 19. After that, the processes similar to ones described above are performed on the sheet, thus an image is formed at the reverse surface of the sheet.

Figure 2:
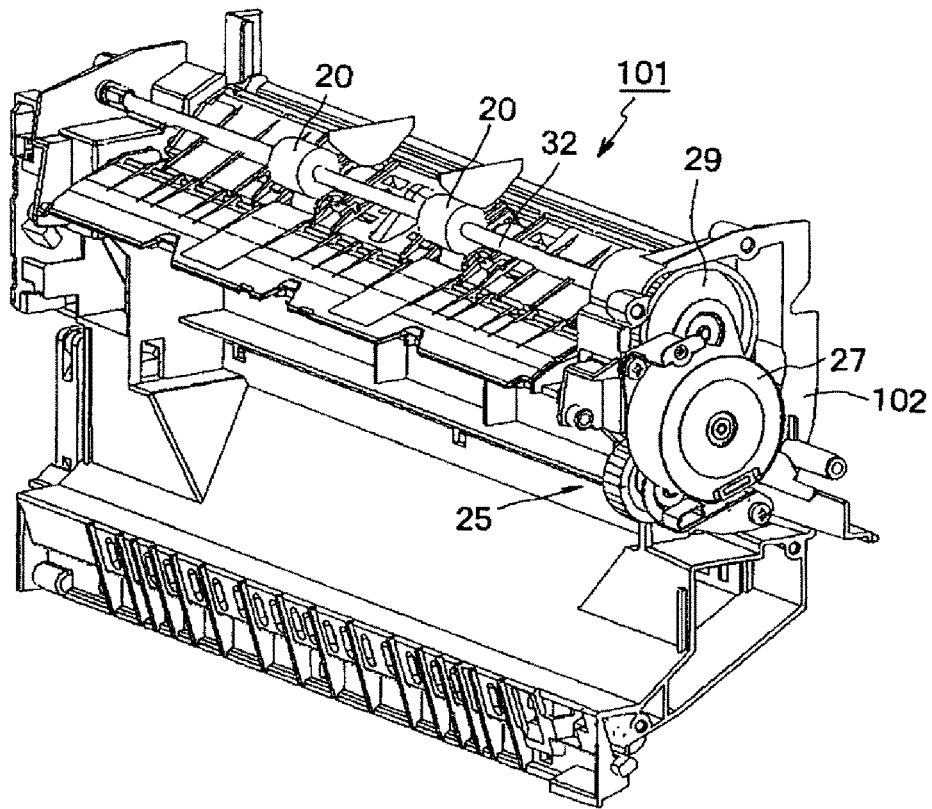
FIG. 2 illustrates a discharge unit included in the image forming apparatus.

Next, the following describes the sheet discharge unit 101 in detail. The image forming apparatus 1 with the sheet discharge unit 101 is one embodiment of the driving apparatus according to the disclosure. FIG. 2 illustrates the perspective sheet discharge unit 101. The sheet discharge unit 101 includes a main body frame 102 made of a resin material, a roller shaft 32, and a drive transmission device 25. The roller shaft 32 is rotatably supported to the main body frame 102. One of the rollers of the conveyance roller pair 20 is integrally mounted to the roller shaft 32. The drive transmission device 25 is installed to one side portion of the main body frame 102. The drive transmission device 25 includes a stepping motor 27 (a driving motor) and a gear group. The stepping motor 27 generates rotary driving power. The rotary driving power generated by the stepping motor 27 is transmitted to the roller shaft 32 via the gear group. Accordingly, the conveyance roller pair 20 obtains rotational power for conveying the sheet.

Figure 3:
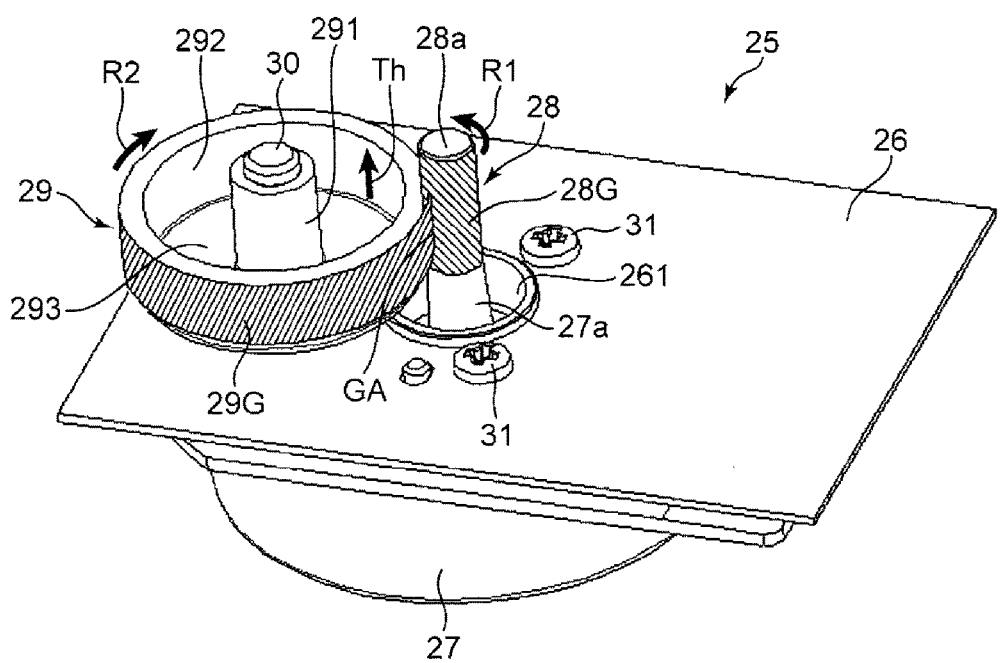
FIG. 3 illustrates a drive transmission device assembled to the sheet discharge unit.
Figure 4:
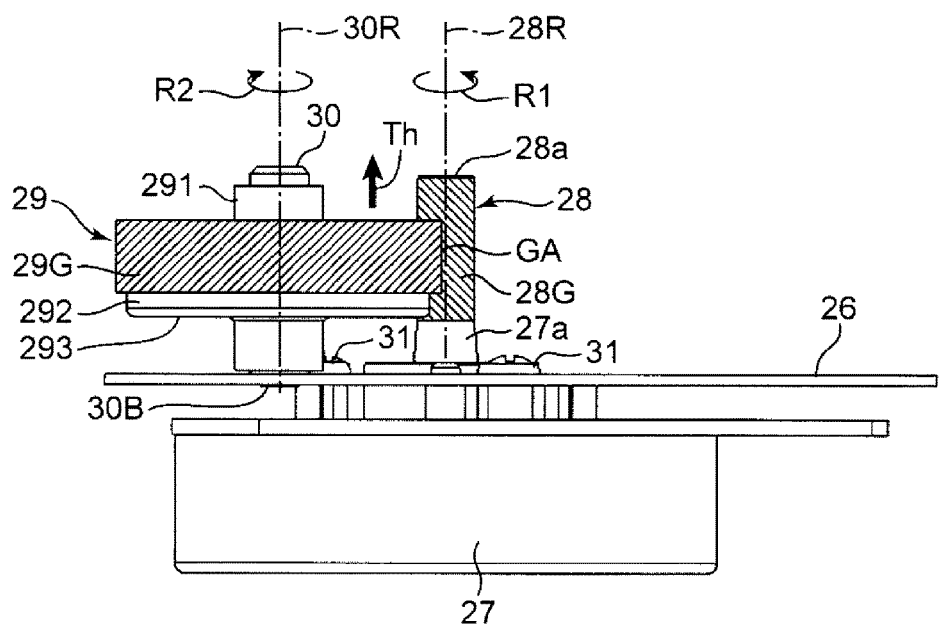
FIG. 4 illustrates a side of the drive transmission device.
Figure 5:
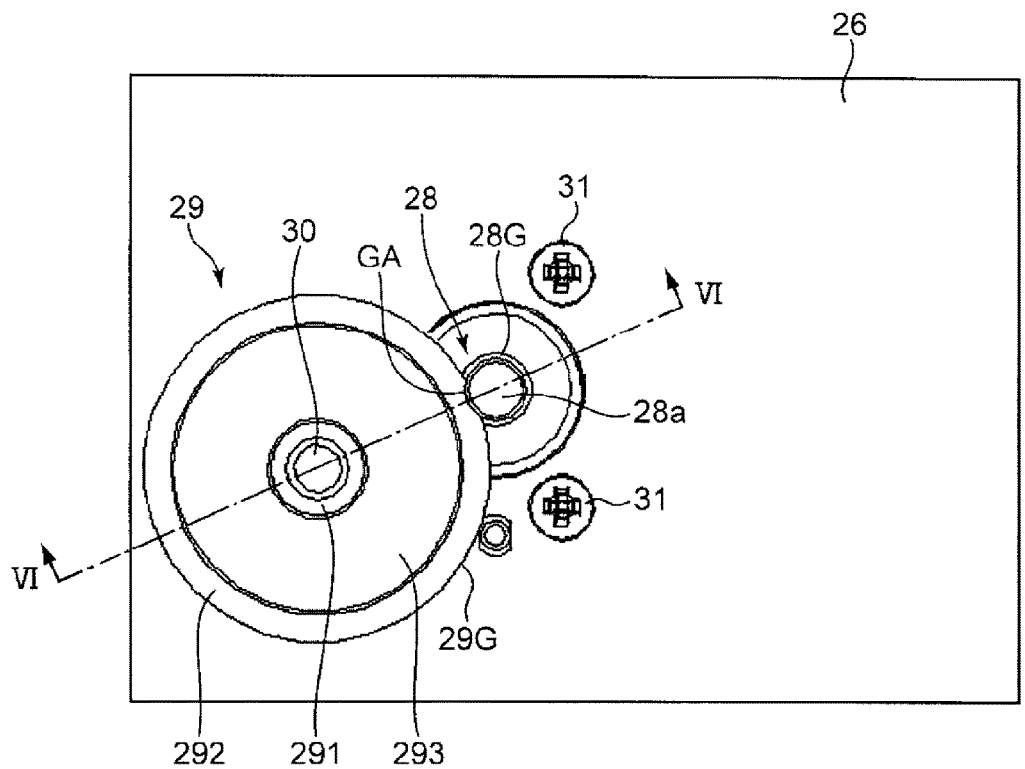
FIG. 5 illustrates a top of the drive transmission device.
Figure 6:
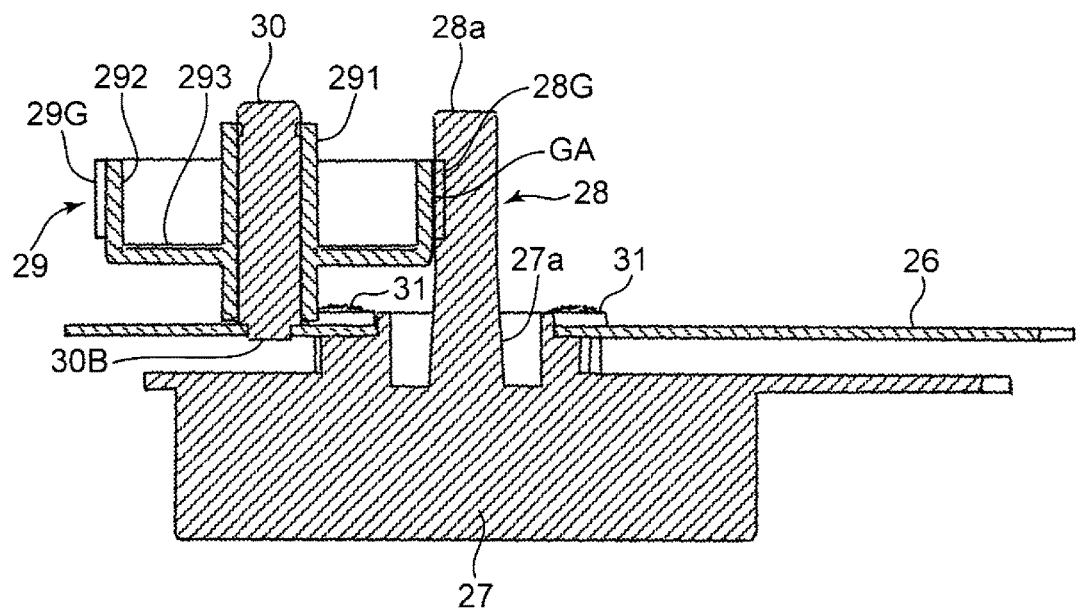
FIG. 6 illustrates a cross section of the drive transmission device taken along the line VI-VI of FIG. 5.

FIG. 3 is a perspective view illustrating the drive transmission device 25. FIG. 4 illustrates a side of the drive transmission device 25. FIG. 5 illustrates a top of the drive transmission device 25. FIG. 6 illustrates a cross section of the drive transmission device taken along the line VI-VI of FIG. 5. The drive transmission device 25 includes a frame 26 (omitted in FIG. 2), and includes a pinion gear 28 (a driving input gear), a reduction gear 29 (a driven gear), and a shaft 30 as the above-described gear group. The frame 26 is made of sheet metal and to which the stepping motor 27 is mounted. The pinion gear 28 is directly connected to an output rotation shaft 27a of the stepping motor 27. The reduction gear 29 is engaged with the pinion gear 28. The shaft 30 rotatably supports the reduction gear 29. The reduction gear 29 is engaged with a gear (not illustrated) mounted to an end portion of the roller shaft 32. Besides, the drive transmission device 25 also includes a gear group for inputting driving power to the fixing unit 22; however, the illustration is omitted here. The gear group, which includes the reduction gear 29, is a gear made of a resin material formed by metal molding.

At the center of the flat-plate-shaped frame 26, a circular through-hole 261 is bored. The stepping motor 27 is located at one side of the surface of the frame 26. The pinion gear 28, the reduction gear 29, and the shaft 30 are located at the other side of the surface of the frame 26. The stepping motor 27 is secured to the frame 26 with three pieces of screws 31 while the output rotation shaft 27a is aligned with the through-hole 261.

The pinion gear 28 is directly connected to the end edge of the output rotation shaft 27a of the stepping motor 27. The pinion gear 28 includes a columnar rotary drive shaft 28a and a pinion gear teeth 28G (first gear teeth). Rotary drive power is provided from the output rotation shaft 27a to the rotary drive shaft 28a. The pinion gear teeth 28G are integrally formed at the circumference surface of the rotary drive shaft 28a. The pinion gear teeth 28G have helical gear teeth (first helical teeth). The pinion gear teeth 28G are twisted leftward (a first direction) with respect to an extending direction of a shaft center 28R of the rotary drive shaft 28a illustrated in FIG. 4 in side view. The columnar shaft 30 has a base end portion 30B secured to the frame 26. The shaft 30 is a columnar shaft located upright or located to protrude from the frame 26 extending parallel to the rotary drive shaft 28a.

The reduction gear 29 freely rotates placing the shaft 30 as a rotation shaft. The reduction gear 29 includes reduction gear teeth 29G (second gear teeth) at the cylindrical outer peripheral surface. The reduction gear teeth 29G also have helical teeth gear (second helical teeth). The reduction gear teeth 29G are twisted rightward (a second direction) with respect to an extending direction of a shaft center 30R of the shaft 30 in side view. The shaft center 28R of the rotary drive shaft 28a is parallel to the shaft center 30R of the shaft 30. The pinion gear teeth 28G engage the reduction gear teeth 29G at an engaging portion GA with one another. Driving of the stepping motor 27 rotates the pinion gear 28 around its shaft. Then, the rotary power is transmitted to the reduction gear 29 via the engaging portion GA, and the reduction gear 29 rotates around the shaft 30.

Figure 7:
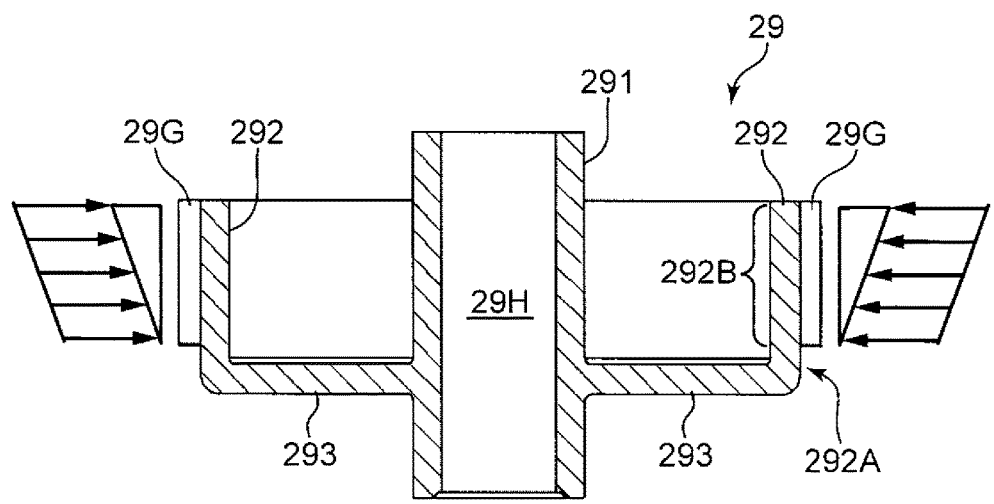
FIG. 7 illustrates a cross section along an axial direction of a reduction gear (a driven gear) according to the one embodiment.

Next, also with reference to FIG. 7, the following describes a detailed structure of the reduction gear 29. FIG. 7 illustrates a cross section along an axial direction of the reduction gear 29. The reduction gear 29 is, as described above, a gear made of a resin material formed by metal molding. The reduction gear 29 includes a boss portion 291 with a cylindrical body, a rim portion 292, and a web 293. The rim portion 292 has a cylindrical body and is concentrically located around the outer periphery of the boss portion 291. The web 293 connects the boss portion 291 and the rim portion 292. The reduction gear teeth 29G are formed at the outer peripheral surface of the rim portion 292.

The boss portion 291 has a through-hole 29H through which the shaft 30 is inserted. The through-hole 29H does not closely fits the shaft 30 and has an inner diameter slightly greater than an outer diameter of the shaft 30. As described above, since the base end portion 30B of the shaft 30 is secured to the frame 26, the shaft 30 itself does not rotate. Due to a clearance present between the inner wall of the through-hole 29H and the outer peripheral wall of the shaft 30, the reduction gear 29 is rotatable with respect to the shaft 30.

The rim portion 292 is a cylindrical body whose axial length is approximately a half of the length of the boss portion 291. The web 293 is a disk-shaped member that connects the outer peripheral surface of the boss portion 291 and the one end side (lower end side in FIG. 7) of the rim portion 292 in the axial direction. The reduction gear teeth 29G are formed at a cylindrical region 292B excluding an end edge region 292A to which the web 293 is connected among the outer peripheral surface of the rim portion 292.

When the resin material is metallically molded, assume that a structure to which a disk-shaped body such as a web is connected to the inner peripheral surface of the cylindrical body is to be molded. A wall of the cylindrical body is drawn to the disk-shaped body at the connection part, likely to generating a concave portion at the outer surface of the cylindrical body (generation of sink mark of resin). This phenomenon is also true of the end edge region 292A at which the rim portion 292 contacts the web 293. The end edge region 292A is easily caved in due to the sink mark of resin. Regarding such end edge region 292A, avoiding formation of the reduction gear teeth 29G prevents generation of a cave portion at the reduction gear teeth 29G. In this embodiment, the web 293 is installed consecutively at the one end side of the rim portion 292 in the axial direction. Accordingly, even if the reduction gear teeth 29G is not formed at the region of the rim portion 292 connecting to the web 293, the reduction gear teeth 29G with sufficient length can be formed at the outer peripheral surface of the cylindrical region 292B.

Figure 8:
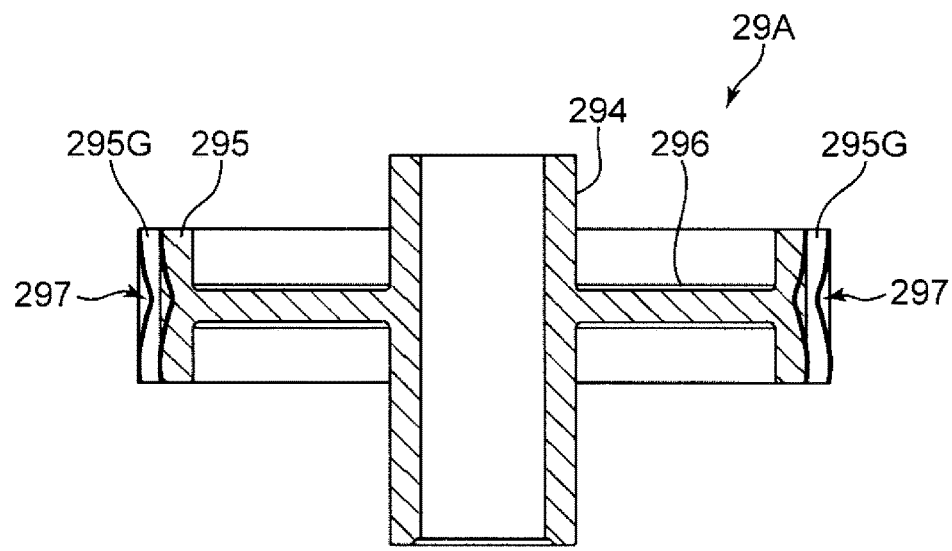
FIG. 8 illustrates a cross section along an axial direction of a reduction gear according to a comparative example.

FIG. 8 illustrates a cross section along the axial direction of a reduction gear 29A (a driven gear) according to a comparative example. The reduction gear 29A includes a boss portion 294 and a rim portion 295, which are concentrically located, and a web 296, which connects the boss portion 294 and the rim portion 295. The rim portion 295 has reduction gear teeth 295G at the outer peripheral surface. The web 296 connects the outer peripheral surface of the boss portion 294 and the inner peripheral surface of the rim portion 295 at near the center of the rim portion 295 in the axial direction. In the above-described structure of the reduction gear 29A, the wall that decreases in thickness by the above-described sink mark of resin causes a part near the region of the rim portion 295 connecting to the web 296 to cave in. This generates a caved portion 297 at the center of the reduction gear teeth 295G in the tooth trace direction. In this case, a contact ratio of the reduction gear 29A with respect to the pinion gear 28 becomes poor, causing vibration and noise. The reduction gear 29 of this embodiment solves this problem. This ensures achieving good engagement of the reduction gear teeth 29G with the pinion gear teeth 28G across the overall length of the reduction gear teeth 29G in the tooth trace direction.

The rim portion 292 illustrated in FIG. 7 has a tapered shape that has a large diameter at the one end side to which the web 293 is not connected, and radially decreases toward the other end side (the end edge region 292A). In association with this, the reduction gear teeth 29G also have a similar tapered shape. That is, a teeth height at the top (the outer diameter part of teeth) of the reduction gear teeth 29G with respect to the rim portion 292 is constant in the tooth trace direction. However, since the rim portion 292 has a tapered shape, the outer diameter of the reduction gear teeth 29G also has a tapered shape in the tooth trace direction.

The tapered shape of the rim portion 292 is induced by a characteristic of shape that the web 293 is connected to the end edge region 292A of the rim portion 292. During molding of the reduction gear 29, a shrink (sink mark) is generated toward the center in the radial direction at the disk-shaped part of the web 293. Accordingly, the end edge region 292A of the rim portion 292 is drawn to the center in the radial direction. Consequently, the rim portion 292 is deformed such that the end edge opposite to the end edge region 292A radially expands to outside. This deformation yields the tapered shape of the rim portion 292 and the reduction gear teeth 29G where the tapered shape radially decreases toward the end edge region 292A. This tapered height is approximately almost several tens micron meters.

As the reduction gear 29A illustrated in FIG. 8, simply connecting the web 296 to a part near the center of the rim portion 295 in the axial direction reduces and avoids generation of the tapered shape. However, this case has a failure that the caved portion 297 may be generated at the reduction gear teeth 295G as described above. Therefore, it is preferred that the reduction gear teeth 29G be constituted to achieve good engagement with the pinion gear teeth 28G by assuming that the rim portion 292 has a tapered shape.

The rim portion 292 may be tapered intentionally. When the reduction gear 29 is formed by metal molding, it is preferred that a mold taper be provided to the boss portion 291 and the rim portion 292, which have a cylindrical shape, as a draft angle in metal molding. For example, a tapered shape caused by the mold taper may be provided to the rim portion 292. Such tapered shapes of the rim portion 292 and the reduction gear teeth 29G may cause a partial contact in engagement between the reduction gear teeth 29G and the pinion gear teeth 28G. However, in this embodiment, even if the tapered shape is present, appropriately setting the direction that the helical teeth of the reduction gear teeth 29G and the pinion gear teeth 28G are twisted and the rotation direction of the pinion gear 28 ensures good engagement of both gear teeth. The following describes this point.

With reference to FIG. 3 and FIG. 4, as described above, the pinion gear teeth 28G are helical teeth, and twisted leftward. On the other hand, the reduction gear teeth 29G are also helical teeth but twisted rightward. Here, the output rotation shaft 27a of the stepping motor 27 provides the pinion gear 28 with a rotatory power rotating around the shaft center 28R of the rotary drive shaft 28a in an anticlockwise direction R1. Driving the stepping motor 27 to rotate the pinion gear 28 in the anticlockwise direction R1 rotates the reduction gear 29, which engages the pinion gear 28, in a clockwise direction R2. Under such conditions of the twist direction and the rotation direction of helical teeth, a thrust power Th is generated on the reduction gear 29. The thrust power Th acts in a direction away from the stepping motor 27 (the direction from below to above in FIG. 3 and FIG. 4). This thrust power Th makes engagement between the pinion gear 28 and the reduction gear 29 close to ideal.

Figure 9:
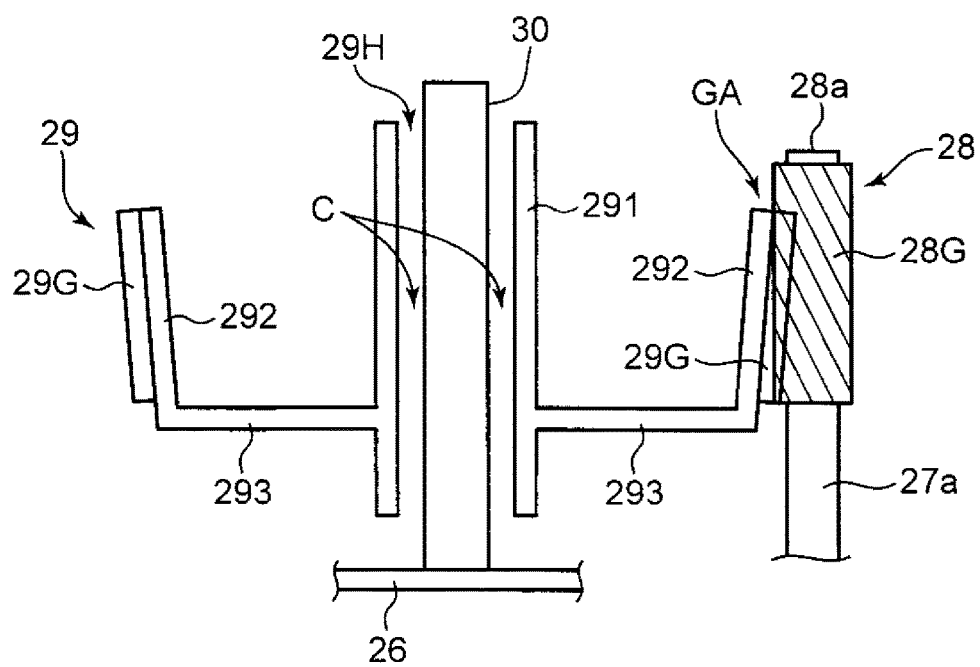
FIG. 9 schematically illustrates a state of engagement between a pinion gear and the reduction gear according to the one embodiment.

FIG. 9 schematically illustrates a state of engagement between the pinion gear 28 and the reduction gear 29 during stop. FIG. 9 exaggeratingly draws the tapered shapes of the rim portion 292 and the reduction gear teeth 29G. The cylinder end edge of the tapered shape of the rim portion 292 at the side to which the outer peripheral edge of the web 293 is not connected has a large diameter. The taper radially decreases toward the cylinder end edge at the side to which the outer peripheral edge of the web 293 is connected. A clearance C is present between the inner wall of the through-hole 29H at the boss portion 291 of the reduction gear 29 and the outer peripheral wall of the shaft 30 (this clearance C is also drawn exaggeratingly). While the pinion gear 28 does not rotate, the reduction gear teeth 29G partially contact the pinion gear teeth 28G at the engaging portion GA, where the pinion gear 28 engages the reduction gear 29, slightly by an amount of the taper of the rim portion 292.

Figure 10:
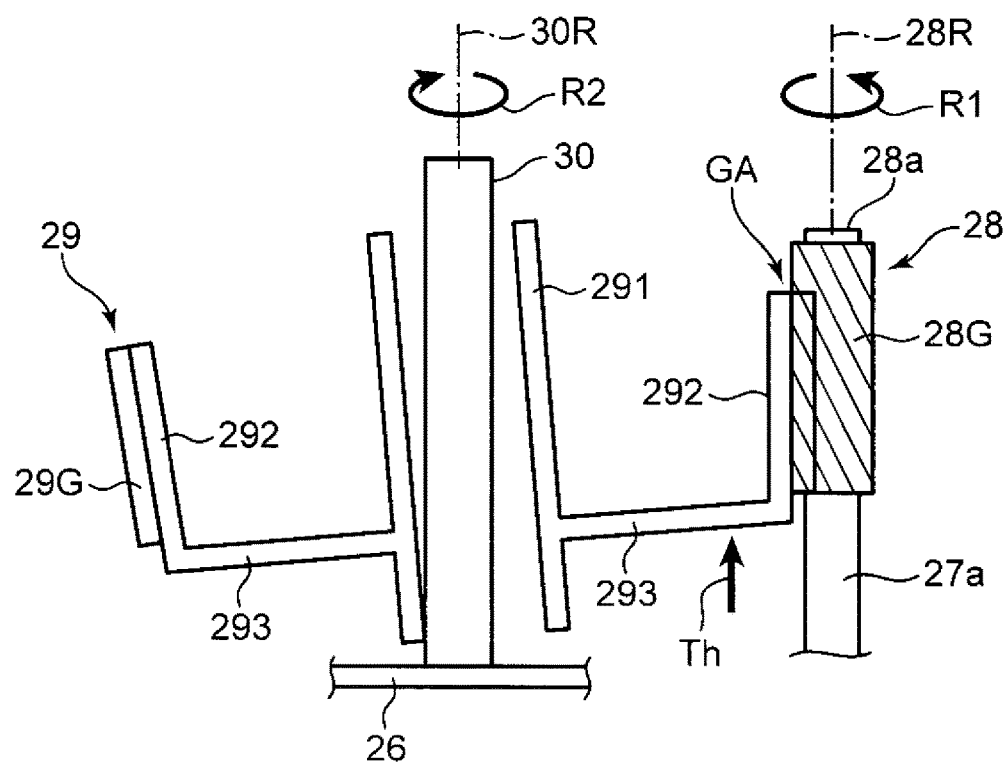
FIG. 10 schematically illustrates a state of engagement between the pinion gear and the reduction gear and illustrates the inclined reduction gear according to the one embodiment.

FIG. 10 schematically illustrates a state where the stepping motor 27 operates, the pinion gear 28 rotates, and the rotary driving power is transmitted to the reduction gear 29. As described above, by rotation of the pinion gear 28 in the anticlockwise direction R1, the reduction gear 29 is rotated in the clockwise direction R2, and the thrust power Th is generated at the reduction gear 29. This thrust power Th inclines the posture of the reduction gear 29 due to the clearance C as illustrated in FIG. 10.

When the inclination of the reduction gear 29 as described above is generated, at the engaging portion GA where the pinion gear 28 engages the reduction gear 29, the rim portion 292 with the tapered shape changes its posture in parallel to the rotary drive shaft 28a of the pinion gear 28. In view of this, the partial contact between the reduction gear teeth 29G and the pinion gear teeth 28G is solved, thus ensuring a high contact ratio of both gear teeth.

According to the above-described driving apparatus of the embodiment, the pinion gear teeth 28G (the first helical teeth), which are helical teeth gear twisting leftward, engages the reduction gear teeth 29G (the second helical teeth), which are helical teeth gear twisting rightward. Transmission of rotary driving power from the pinion gear 28 to the reduction gear 29 generates the thrust power Th. This thrust power Th causes the reduction gear 29 to swing with respect to the shaft 30 in a range of the clearance C of the boss portion 291. Since the rim portion 292 has a tapered shape, the swing causes the rim portion 292 to change its posture to be parallel to the rotary drive shaft 28a. Therefore, this makes engagement between the pinion gear teeth 28G and the reduction gear teeth 29G close to ideal engagement. This can solve problems such as generation of vibration and noise and deterioration of gears.

Therefore, with the driving apparatus (the image forming apparatus 1) with the stepping motor 27 and the driven gear (the reduction gear 29) made of a resin material, vibration and noise can be reduced as much as possible. Accordingly, this can achieve reducing noise of these units, also ensuring providing the image forming apparatus 1 without image quality deterioration caused by vibration. The use of the frame 26 can provide the driving apparatus to which the stepping motor 27, the pinion gear 28, and the reduction gear 29, which are driving sources, are installed compactly.

One embodiment of the disclosure is described above in detail; however, the disclosure is not limited to this. For example, the embodiment uses the exemplary sheet discharge unit 101 is as an example of the driving apparatus. The driving apparatus may be a driving apparatus for driving the photoreceptor drum 2a, a developing roller, the primary transfer roller 5a, or a similar unit. The image forming apparatus 1 is used as exemplary apparatus to which the driving apparatus is applied; however, the driving apparatus may be applied to an apparatus other than an image forming apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A driving apparatus, comprising:
a driving motor having a motor output rotation shaft;
a frame on which the driving motor is mounted;
a driving-input pinion gear having a rotary drive shaft directly connected to the motor output rotation shaft and having first gear teeth, the rotary drive shaft therein being configured to receive rotary driving power from the driving motor, the first gear teeth being integrally formed with the rotary drive shaft;
a columnar shaft provided extending parallel to the rotary drive shaft and protruding from the frame;
a driven gear that engages the driving input gear, the driven gear including:
a cylindrical boss portion wholly made of a resin material, the boss portion having a through-hole through which the columnar shaft is inserted;
a tapered rim portion disposed concentrically with and outer peripherally of the boss portion;
second gear teeth formed on an outer peripheral surface of the rim portion; and
a web linking a circumferential surface of the boss portion with the rim portion along one end of the rim portion axially, the web therein being provided between the frame and a frame-ward end of the second gear teeth, along a direction perpendicular to the rotary drive shaft and the columnar shaft;
wherein
the first gear teeth are first helical teeth twisting in a first direction with respect to a direction in which the rotary drive shaft extends,
the second gear teeth are second helical teeth twisting in a second direction that is the opposite of the first direction,
the rim portion is tapered, radially decreasing toward the end to which the web is linked,
the through-hole in the boss portion has an inner diameter greater than the columnar shaft outer diameter, and
the rotary drive shaft rotational direction, the first direction, and the second direction are established such that, with the driven gear tilting because of clearance between the through-hole and the columnar shaft, under thrust power generated by engagement between the first helical teeth and the second helical teeth and transmission of the rotary driving power from the driving input gear to the driven gear, the inclination changes the posture of the tapered rim portion so as to parallel the rotary drive shaft.

* * * * *